United States Patent [19]

Burton

[11] 4,302,683
[45] Nov. 24, 1981

[54] REACTION ENGINE DRIVEN ELECTRICAL GENERATING SYSTEM WITH POWER LOAD VARIATION CONTROL CAPABILITY

[76] Inventor: Von L. Burton, 1729 Redding Rd., Huntsville, Ala. 35806

[21] Appl. No.: 128,056

[22] Filed: Mar. 7, 1980

[51] Int. Cl.³ .................... F01D 1/18; F01D 15/10; F02C 3/16; F03B 1/04
[52] U.S. Cl. ................ 290/4 R; 60/39.35; 415/80; 415/82; 290/52
[58] Field of Search ............... 290/4 R, 52; 60/201, 60/39.34, 39.35; 415/80, 82; 73/518–520; 324/163, 165, 177

[56] References Cited

U.S. PATENT DOCUMENTS

| | | | |
|---|---|---|---|
| 1,003,708 | 9/1911 | Coleman | 60/39.35 |
| 2,116,718 | 5/1938 | Stubbs | 60/315 |
| 2,444,742 | 7/1948 | Lutjen | 60/39.35 |
| 2,669,836 | 2/1954 | Abbott | 60/35.6 |
| 2,709,895 | 6/1955 | Mount | 60/49 |
| 2,977,756 | 4/1961 | Stone | 60/39.28 P |
| 3,099,254 | 7/1963 | Kerr | 60/906 |
| 3,120,739 | 2/1964 | Zillman | 60/39.35 |
| 3,177,660 | 4/1965 | Haller | 60/39.35 |
| 3,200,588 | 8/1965 | Math | 60/39.35 |
| 3,418,485 | 12/1968 | Anderson et al. | 290/1 |
| 3,541,787 | 11/1970 | Romoli | 60/39.35 |
| 3,733,095 | 5/1973 | Sinclair et al. | 290/52 |
| 3,905,499 | 12/1976 | Horii | 73/519 |
| 4,112,683 | 9/1978 | Bess | 73/518 |

*Primary Examiner*—J. V. Truhe
*Assistant Examiner*—Shelley Wade
*Attorney, Agent, or Firm*—Bradford E. Kile

[57] ABSTRACT

A reaction engine driven electrical generating system comprising an electrical generator having an armature and a reaction engine driven to rotate the armature for generating electricity. The reaction engine drive includes a generally cylindrical housing with an internal truncated cone which internally divides the housing into two sections. A drive shaft extends generally horizontally into the housing and a reaction force rotation unit carrying a plurality of reaction engines is mounted upon the drive shaft. An enlarged air port is fashioned within one end of the housing and cooperates with an air inlet disc fixedly connected to the drive shaft. A plurality of air inlet aperatures extend through the air inlet disc and air conduits connect the inlet aperatures directly to corresponding intakes of said plurality of reaction engines. A monitor is operably connected to the armature or drive shaft and serves to provide a readout of speed of rotation of the drive shaft and generator armature. A fuel control is then modulated by the speed monitor to control the fuel flow to the reaction engines and maintain a generally constant armature speed over varying conditions of electrical load.

19 Claims, 20 Drawing Figures

REACTION ENGINE DRIVEN ELECTRICAL GENERATING SYSTEM WITH POWER LOAD VARIATION CONTROL CAPABILITY

BACKGROUND OF THE INVENTION

This invention relates to an electrical current generation system. More specifically this invention relates to a reaction engine driven electrical generating system.

The generation of electricity is based upon principles espoused and experiments performed by Michael Faraday (1791-1867) which can be stated as follows; an electromotive force (EMF) is induced in a conductor (copper for example) whenever it cuts through magnetic lines of force. In this regard large electrical generators having field windings which surround a rotor or armature having windings. Rotation of the armature within the field produces an electric current. All substantial forms of alternating current of the type used in homes and businesses are generated by application of this principle.

There are three primary systems in existence today that are used for rotating armatures and commercially generating electricity. These primary systems comprise (1) water dams, and the utilization of (2) coal or oil and (3) nuclear fission to heat water that produces steam. Falling water or steam pressure causes a turbine to turn which in turn rotates an armature.

In a basic hydroelectric system, energy from stored water which is confined in a larger reservoir is channeled through a control gate that adjusts the flow rate. The flowing water passes through blades and control vanes of a reaction type turbine, which turns a shaft which in turn is connected to an armature inside a generator housing. Rotation of the armature then causes electrical energy to be generated.

In a fossil fuel system, the fossil fuel is burned and the heat from the combustion process is concentrated around a boiler where circulating water is converted to steam. The high pressure steam is used to rotate a turbine which is connected to a shaft. This shaft is connected directly to an electric generator and provides the necessary mechanical energy to rotate the armature (or field).

Nuclear fission power systems contain nuclear reactors which "burn" nuclear material whose atoms are split, causing the release of heat. The heat from the fission process is used to change circulating water into steam. The high pressure steam rotates a turbine that is connected to a shaft which is in turn connected to a rotor (field) inside a generator housing.

While such prior known systems are widely utilized, they exhibit various disadvantages such as remoteness from user locations and for inefficiency. Moreover, nuclear and fossil fuel systems tend to be environmentally unacceptable and even hazardous.

One theorist has suggested that a plurality of ram jet motors or rocket motors may be mounted around a vertically oriented shaft which in turn is connected to a rotor of an electrical generator. Provision is not made to adequately control such a system and it is doubted that the concept could adequately function in a commercial environment.

The difficulties suggested in the preceeding are not intended to be exhaustive, but rather are among many which may tend to reduce the effectiveness of prior electrical generation systems. Other noteworthy problems may also exist; however, those presented above should be sufficient to demonstrate that commercial generating systems appearing in the past will admit to worthwhile improvement.

OBJECTS OF THE INVENTION

It is therefore a general object of the invention to provide a novel electrical generating system which will obviate or minimize difficulties of the type previously described.

It is another general object of the invention to provide a novel electrical generation system wherein alternate "cleaner" sources of energy may be advantageously utilized.

It is still another object of the invention to provide a novel electrical generation system which will be operable with the use of unlimited and/or replaceable sources of fuel.

It is yet another object of the invention to provide a novel electrical generation system wherein present generator and distribution technology may be advantageously utilized.

It is a further object of the invention to provide a novel electrical generation system which will be more efficient than presently known systems.

It is still another object of the invention to provide a novel electrical generation system wherein varying load patterns may be automatically accommodated.

It is yet another object of the invention to provide a novel electrical generation system wherein power generating units may be facilely serviced and/or replaced with a minimum down time of a unit.

It is yet still a further object of the invention to provide a novel electrical generation system wherein regulation and control of the system will be facilitated.

It is another object of the invention to provide a novel electrical generation system wherein waste gases are advantageously tapped for energy and environmentally cleansed.

It is a further object of the invention to provide a novel electrical generation system wherein wide variations in power requirements may be facilely achieved.

BRIEF SUMMARY AND OPERATING THEORY OF THE INVENTION

A preferred embodiment of the invention which is intended to accomplish at least some of the foregoing objects comprises an electrical generator including field windings and an armature which is operably connected to a reaction engine generation system.

A generally cylindrical housing is disposed axially adjacent to the electrical generator. The housing is provided with first and second end plates to form an enclosure. A truncated cone is coaxially mounted within the housing to form an exhaust gas deflector plate and further divides the housing into an inner and outer chamber. A drive shaft extends axially through the housing and carries a reaction force rotation unit with radial support arms. A reaction engine is mounted at the extremity of each arm within the inner chamber.

An enlarged air port is axially fashioned through the second plate and peripherally receives an air inlet disc mounted upon the drive shaft. A plurality of air apertures are cut through the inlet disc. A conduit extends between each air aperture and a respective intake port of a reaction engine to provide a direct air inlet passage for each engine.

The first end plate is arcuately bowed outwardly and forms with the inner chamber an exhaust collection chamber or manifold which may be vented to the atmosphere through a catalytic converter to scrub the exhaust.

A monitor is operably connected to the armature or drive shaft to detect the rotational speed of the generator armature. A fuel control system such as a flow control valve, fuel pump, or the like leading to the reaction engines is then regulated in response to monitored shaft speed to maintain the operating speed of the armature notwithstanding variations in load on the system.

Using the above outlined system, speeds as slow as 5 rotations per minute (rpm) can be accommodated using an appropriate gear wheel configuration at the point where the drive shaft interfaces with the generator housing. The drive shaft, reaction force rotation unit and reaction engines are disposed in a housing having a slanted deflector plate in the path of exhaust gases and an angular chamber communicating with the exhaust manifold. Means are provided for circulation of coolant water around the periphery of the deflection plate, with heated water being removed and applied to other purposes such as heating of buildings.

The reaction engines which rotate the shaft are preferably turbojet engines which will burn alcohol, hydrogen or synthetic fuels. A suitable condensor may be incorporated into the system, where appropriate, that will convert steam, if it is the output from the system back into water.

By embodying the features of the subject reaction engine system, the system efficiency is greatly enhanced. One hundred percent efficiency of a jet engine would require total energy loss from the combustion of fuel from the engine's exhaust. Friction from within the engine will cause a neglible loss; about 5%. The accepted efficiency of quoted figures of a liquid jet engine is about 50%. This means that 50% of the energy from the fuel is converted directly into thrust and 50% in the form of wasted heat (energy) is expelled from the tail of the engine's exhaust. This remaining 50% is normally lost since thrust is the only usable parameter from a conventional engine system which is used to propel an aircraft. The subject system traps most of this lost energy in the water jacket thus improving overall efficiency from (without heat energy in water jacket entrapment) 50% when it is compared with a configuration that embodies a reaction engine to approximately 90% allowing for an additional fraction loss from the system itself.

A conventional jet engine would provide the energy requirements of 6,079 homes or about 25,000 people. Engines of the type which are used on a supersonic transport would provide the needs of 24,327 homes of 100,000 people. For smaller requirements, a conventional Boeing 707 engine would provide the needs of 2,838 homes or 12,000 people. This system can, of course, be constructed in tandem order for added power requirements.

Consider a Boeing 747 jet that cruises at 60,000 (4 jet engines at 15,000 hp each), one horsepower equals 745.7 kilowatts; yielding 44,742 kilowatts in equivalent energy. If there are 8,760 hours in a single year, 8,760 hours times 44,747 yields the equivalent of $3.91939 \times 10^9$ kilowatt hours per year. It is estimated that the average home in the United States uses the equivalent of about 58,000 kilowatts hours of total energy per year. Thus $3.91939 \times 10^9$ divided by 58,000 kilowatt hours yields about 6,757 homes, 6,757 multiplied times 90% efficiency yields 6,079 homes. Similar calculations can be performed for the other engines indicated above.

Actually these numbers do not represent the full capability of the system. Since 60,000 horsepower represents the thrust work obtained from the engine, the 90% was actually 90% of that parameter; that is, the 60,000 horsepower does not contain the wasted heat from the engine, only the thrust. Depending on the system, more homes could be supported by either converting this lost potential energy into electrical energy, useful heat energy or for other uses that would benefit from the availability of hot water or steam.

In addition to this feature of versatility and engine efficiency, it is also insignificant what fuel is used provided that it is not petroleum based. There are basically three fuels of primary appeal. They are alcohol, hydrogen and future synthetic fuels. This versatility is possible because energy is measured by its BTU content. Temperature measures the intensity of heat. The system could, of course, operate using petroleum based fuels.

In order to visualize this, it is advantageous to view fuel before it enters its combustion process. A pound of alcohol would have 12,700 BTU's while hydrogen would contain about 60,000; about 5 times as much energy. Synthetic fuel will contain in the neighborhood of 15,000 BTU's per pound. Considering that the subject system is an energy conversion system, it will convert any type of fuel that the engines are designed to accept. Consider, for example, alcohol. The subject system will supply the electrical needs of 24,000 people using the total volume equivalent of a typical interstate travel bus of alcohol per day. To layout this analysis it is necessary to some extent to be repetitive. Consider a 747 jet airplane and the energy required to keep it flying aloft. That amount of energy is 60,000 horsepower (only the energy in terms of thrust-work is contained in the 60,000 horsepower figure). Horsepower is conceptually the same as watts. Actually the person that discovered the watt determined the unit horsepower. That person was James Watt (1736–1819) and of course is credited with determining the units of both horsepower and watts. He determined that a horse pulling for one minute could lift some 32,400 pounds to a height of one foot. Later, to calculate the power of his engines, Watt rounded off this number and set the standard unit of 33,000 pounds raised one pound per minute. In today's scientific shorthand, this is expressed as 550 foot-pounds per second, which is the equivalent of saying 745.7 watts (550 foot-pounds per second times 1.356). Horsepower, therefore, is the same as "watts". Since there are 745.7 watts in one "horsepower", four 747 jet engines cruising at 60,000 horsepower is the same as saying that it is cruising at 44,742 kilowatts.

As indicated above, since there are 8,760 hours in a year, the energy required to keep a 747 jet flying 24 hours per day 365 days per year would be $3.91939 \times 10^9$ kilowatt hours. Since each home in the United States uses about 58,000 kilowatt hours per year, the energy required to keep the 747 aloft would supply the needs of 6,079 homes ($3.91939 \times 10^9$ divided by $58,000 \times 0.90$) assuming 90% efficiency.

It is all in the BTU content of the fuel used. The BTU content per pound of jet fuel is 18,500 and alcohol is 12,770. Thus there is a great deal of energy in a pound of alcohol, however less than that in a pound of jet fuel. From the above the average U.S. home uses about 58,000 kilowatt hours per year. A "kilowatt-hour" is conceptually the same as a "BTU." There are 3,413 BTU's in one kilowatt hour. Thus, each home would use about 545,325.7 BTU's per day (158.9×3,413). Since one pound of alcohol contains 12,770 BTU's, each home would use about 42 pounds of alcohol per day (545,325.7 divided by 12,770) which is the equivalent of 5.3 gallons per day. Since there are 0.1337 cubic feet in one gallon 5.3 gallons is the equivalent of 0.70 cubic feet; not very much space. However, when it is considered that a 747 jet carries its fuel in its wings, the volume of the wings would be the required volume to keep the plane flying from five to six hours. Assuming the volume equivalent of the wings would support flight for four hours, six pairs of wings stacked would represent the total volume requirement to keep the plane flying 24 hours per day; not much volume. Actually, for alcohol, since its BTU content is 12,770 BTU's per pound, an additional pair of wings should be stacked since aviation fuel contains a BTU content of 18,500 BTU's per pound and alcohol 12,770 BTU's per pound. Even less hydrogen per pound would be required in that its BTU content is five times that of alcohol (60,000 BTU's per pound versus 12,700 BTU's per pound). Also, less synthetic fuel per pound would be required per output unit of work since its expected BTU content will be in the neighborhood of 15,000 BTU's.

A word concerning the utilization of synthetic fuel might be appropriate at this point. The use of synthetic fuel would be feasible but the major trade-off is not cost but the possible value of the system as it relates to improved efficiency as well as its minimal environmental impact when it is compared with converted coal power plants that liberate significant carbon dioxide by-products through their smoke stacks. The subject system lessens, or possibly to a large extent eliminates, this danger because more of the energy from the carbon based material (coal or a synthetic which is made from coal) is converted directly into energy.

High speeds for such a system would be undesirable due to the effect of centrifugal forces acting upon the engine mounting points. The subject system provides for a great deal of flexibility in this sense. More specifically, the gear wheel interface joining the rotor shaft with the generator is fitted with a suitable cogwheel configuration which provides for adjustments in the speed of the reaction engine in the chamber.

Another factor that dictates the speed at which the reaction engines must rotate is the number of magnetic poles contained on the rotor of the generator. This relationship is given by $$f = \frac{Pn}{120} \text{ cycles per second}$$

Where P represents the number of poles on the generator and n the number of revolutions the generator must be rotated in one minute and f the frequency per second of the current emerging from the generator (cycles per second).

In the United States 60 cycles per second is the standard cycles per second.

Since $f = \frac{Pn}{120}$ $$n = \frac{f \times 120}{P}$$

-continued $$n = \frac{60 \times 120}{P}$$

This puts the number of poles on the rotor in direct relation to the number of revolutions the rotor must make in one minute. For example, 200 revolutions could be provided by placing 36 poles on the rotor.

An optimum gear wheel configuration would be designed for each system that might have unique capabilities in terms of requirements from homes and businesses. A configuration of one 8-tooth wheel meshing with one 40-tooth wheel would provide the required rotation for the 36 poles for the example as provided above. The reaction engines would make 5 rotations per minute, the generator 60 rotations per minute and 60 cycle current would be generated.

For this same configuration the reaction engine's rotation rate of the shaft leading to the rotor or field would not exceed 200 rpm if the generator shaft was direct drive; thus eliminating the gear wheel configuration. From this perspective the torque arm distance from the generator extension shaft must be considered. For a 10 foot torque arm the reaction engine would travel at a rotation rate of 142.6 miles per hour (62.8×200×0.01136). The numerical result of 62.8×200 yields the number of total feet (distance) a 10 foot arm would be required to travel in one minute. The conversion factor 0.01136 converts this numerical result into miles per hour.

If this torque arm is increased to heights of 20, 30 and 40 feet respectively, the resulting miles per hour would be 385,427 and 569 miles per hour respectively. The engines would rotate the shaft at 200 rpm, but perform as if they were operating at 569 mph. A rotary arm 40 feet implies a diameter of about 80 feet—the equivalent height of roughly a 5 story building.

A turbo jet usually contains a multi-stage axial compressor (alternate sets of rotating and stationary blades) drawing in air and compressing it. Fuel (alcohol, hydrogen or future synthetic fuels) is injected into the combustion chamber and the subsequent rise in temperature produces a considerable increase in the volume of gases which are expelled through the exhaust nozzle at the rear of the engine. The performance of a turbo-jet can be improved by means of an after-burner, which is a second combustion chamber placed between the turbine and the propulsion nozzle. Additional fuel is injected into this chamber and combustion is effected with the oxygen unconsumed in the main combustion process.

Ram jets would be most undesirable and unattractive in that their design does not provide for adaption of a control system. It is a jet with no moving parts. The ram jet engine began to receive attention during the second half of the 1940's and reached its peak in the 1950's. These jets have been called flying stove pipes for the absence of rotating parts that characterize the turbo engine. The ram jet gets its name from the method of air compression. It cannot operate from standing but must be accelerated to a high speed by another means of drive. The air enters a spike-shaped inlet and diffuser which serves the same purpose as the compressor. In the ram jet, fuel is injected and burns with the aid of flame throwers that stabilize the flame. The burning fuel imparts thermal energy to the gas, and the expansion through the nozzle at speeds greater than the entering air produces the forward thrust. The ram jet, always needing an auxiliary propulsion system for starting, got squeezed between improved turbine engines and rockets around the 1950's and never recovered. The absence of desirable qualities of the ram jet caused its demise.

It is actually the rise of the incorporation of the turbine in the engine that eliminated one of the above negative characteristics of ram jets and caused its demise. This improvement led to the capability of moving to lower speeds and still maintain operation. The lack of this design embodiment in the ram jet would make it undesirable for use with this system. The turbines control the intake and compression of air entering the system.

A high speed efficiency of the reaction engines obtained at 200 revolutions per minute may be achieved by an adjustment of the torque arm distance from the drive shaft. The rise in propulsion efficiency of the turbo jet has about a 45 degree slope and as defined here represents a straight line drawn in such a way that it coincides with the maximum portion of the actual curve. Five hundred sixty-nine (569) miles per hour for a 40 foot arm versus 142 miles per hour with a 10 foot arm would not significantly impact the overall efficiency of the subject system. It is relatively insensitive to engine efficiency. What is impacted is increased effect of wear on the engine and more frequent engine replacement. An engine operating at higher efficiencies would extend engine time but not affect the efficiency of the overall system to any significant extent. To accommodate various requirements, the volume of the exhaust deflector chamber can be increased. A cooling fin by-pass mechanism is also incorporated to accommodate various heat dissipation rates.

Integral to a utility power system is its control system. As amperage load is increased from the utilization of home appliances and industry requirements, the rotor inside the generator housing (or field surrounding the rotor) begins to resist rotation.

The subject system includes three types of control systems either of which may be used singularly and alternately: (1) a rotor rotation rate variation detector control system, (2) an eddy current inducement valve control system, and (3) a magnetic interaction control systems. Non-embodiment of a control system into the design of a power generating system of this type would result in a non-functioning system in the sense of accommodating various power load changes.

The rotor rotation rate variation detector control system works on the principle of a sensor juxtapositioned to a rotating shaft carrying "n" circumferentially mounted magnets. As the magnets pass in front of the sensor, the rate of passage will be detected. The rate of change causes a flow valve or fuel pump to vary fuel flow to the engines to meet the varying load conditions.

The eddy current inducement valve actuator system utilizes the principle of eddy currents. An electric current induced within the body of a conductor when the conductor moves in a region where there is a change in magnetic flux will react with the field of the magnet to produce a force which turns the magnetic field and a valve or fuel pump control permitting the flow of sufficient fuel to the engines to allow for varying amperage load conditions. The faster the magnet rotates, the greater the movement of the fuel pump control. As the generator drive shaft tends to slow down in speed, the fuel valve or fuel pump control would be calibrated to open an amount to permit sufficient fuel to cause the engines to maintain a constant speed.

The magnetic interaction control systems utilize magnetic interaction to rotate a valve or fuel pump control and permit fuel flow to engines whose requirements would vary depending upon amperage load.

Considering the principle behind operation of this control system, a magnet or coil turns so that its magnetic moment vector "M" lines up with the magnetic intensity vector "B", that is, there must exist a torque acting to rotate (turn) "M" into "B" when the vectors are not aligned. This torque is proportional to the size of the angle between the two vectors.

Different magnets or coils at the same magnetic orientation in the same magnetic field will experience different torques. For a given orientation in a given magnetic field, the torque on a coil is proportional to the number "N" of turns and the area "A" of the circuit formed by each turn. Hence, a magnetic moment can be defined as below.

The magnetic moment of a coil is a vector whose magnitude is the product of the number of turns, the current in each turn and the area of the circuit, and whose direction is perpendicular to the plane of the coil in the sense given by the right-hand rule. Thus: Magnetic moment vector = number of turns (N) × current in each turn (I) × area formed by each turn (A)

$$M = NIA \tag{1}$$

Thus with this definition, the torque "L" is proportional to "M" and the sine $\theta$. The torque of course is different in different magnetic fields. It is convenient to define the magnetic field (B) in terms of its intensity so that the torque is also proportional to "B"; that is, to use torque on a coil of unit magnetic moment oriented at $\theta = 90°$ as a measure of magnetic density. Hence, the following equation for torque can be used as the defining equation for the magnitude "B".

$$L = MB \sin \theta \tag{2}$$

Where the following units are derived.
L is in Newton meter (N.m)
M is in Area meter squared (A.m2)
B is in Webers per meter squared (Wb/m2)

The unit of magnetic intensity defined by this equation is given the name Weber per square meter. From equation (2) one Weber per square meter is the magnetic intensity that will result in a torque of 1 N.m on a coil of magnetic moment 1 A.m² placed with the axis perpendicular to the direction of the magnetic intensity.

All magnetic units can be expressed as or in terms of mechanical units and the unit of electrical charge or current. Thus from equation (2) it is noted that the unit of "B" can be written as $$\frac{Wb}{m^2} = \frac{1N}{A \cdot m} = 1 \frac{kg}{c \cdot s}$$

The coil may be wound on a circular frame or a rectangular frame or on a frame of any other shape. If the different turns on the coil have different areas, "A" is to be taken as the average area "A". Since the magnetic torque is proportional to the current in the coil, the spring torque is proportional to the current in the coil.

With these coil arrangements for the actuator, movement will correspond to a definite value of IV where
I = current in fixed coils
V = voltage in torque coil From equation (2), as previously stated "L" is in units of Newton meter (N.m)

$$L = MB \sin \Theta$$

$$L = \frac{Wb}{m^2} = \frac{N}{A \cdot m}$$

$$L = \frac{N}{A \cdot m} \cdot \frac{A \cdot m^2}{1} = N \cdot m \text{ magnetic torque}$$

Alcohol is the preferred fuel source of fuel for use in the subject system. Alcohol has the advantages of the utilization of almost any organic plant material, one of which is corn. One bushel of corn yields the equivalent output of 18 pounds of fuel (alcohol). Other feed stocks could be used with similar alcohol yields.

Alcohol is significantly less a pollutant than the more carbon based fuels such as jet fuel, gasoline and of course coal. Alcohol does not by-product hydrocarbons that affect the ozone layer of the atmosphere, but has the advantage of a neglible by-product termed aldehydes. The deminimus impact on the atmosphere coupled with its replaceable production from a variety of organic plants makes alcohol an attractive fuel for the subject system.

Turbo jet engines can facilely be modified to accept alcohol as it is an adjustment of the fuel-air mixture ratio in the engine that would make such engines adaptable to this system.

Hydrogen is also an attractive fuel. At standard pressure (14.7 psia) the temperature of liquid hydrogen is −423° F.; it is the second coldest substance known.

The greatest attribute of hydrogen as a fuel, however, is that it can produce the highest exhaust velocity of any molecular substance (the higher the exhaust velocity, the greater the propulsive thrust that can be produced per unit mass of propellant). The reason hydrogen produces the highest exhaust velocity is due to the low molecular weight and high BTU content/pound. Its molecular weight, two, is the lowest of any substance in nature. This characteristic combined with its great abundance in the form of water makes hydrogen an attractive fuel for the subject system.

Engines adapted for the subject system operate on a basic turbo jet engine principle, however, in one embodiment a different type of heat exchanger normally associated with such engines will be used. In this regard, the heat exchanger of an engine for the subject system may use part of the hot water or a by-product of the engines heat to heat the hydrogen and convert it from −423° F. through 1300° F. and up to 2200° F. the combustion gas temperature. The heat exchangers would be either flat plate, shell and tube, cross flow or center flow types with the shell and tube appearing as the most attractive. Thrust would be limited only by the size of the engine but with current technology at about a 12,000 hp level. Hydrogen, of course, is non-polluting—its output being that of water.

THE DRAWINGS

Other objects and advantages of the present invention will become apparent from the following detailed description of preferred embodiments thereof taken in conjunction with the accompanying drawings, wherein.

DETAILED DESCRIPTION

Figure 1:
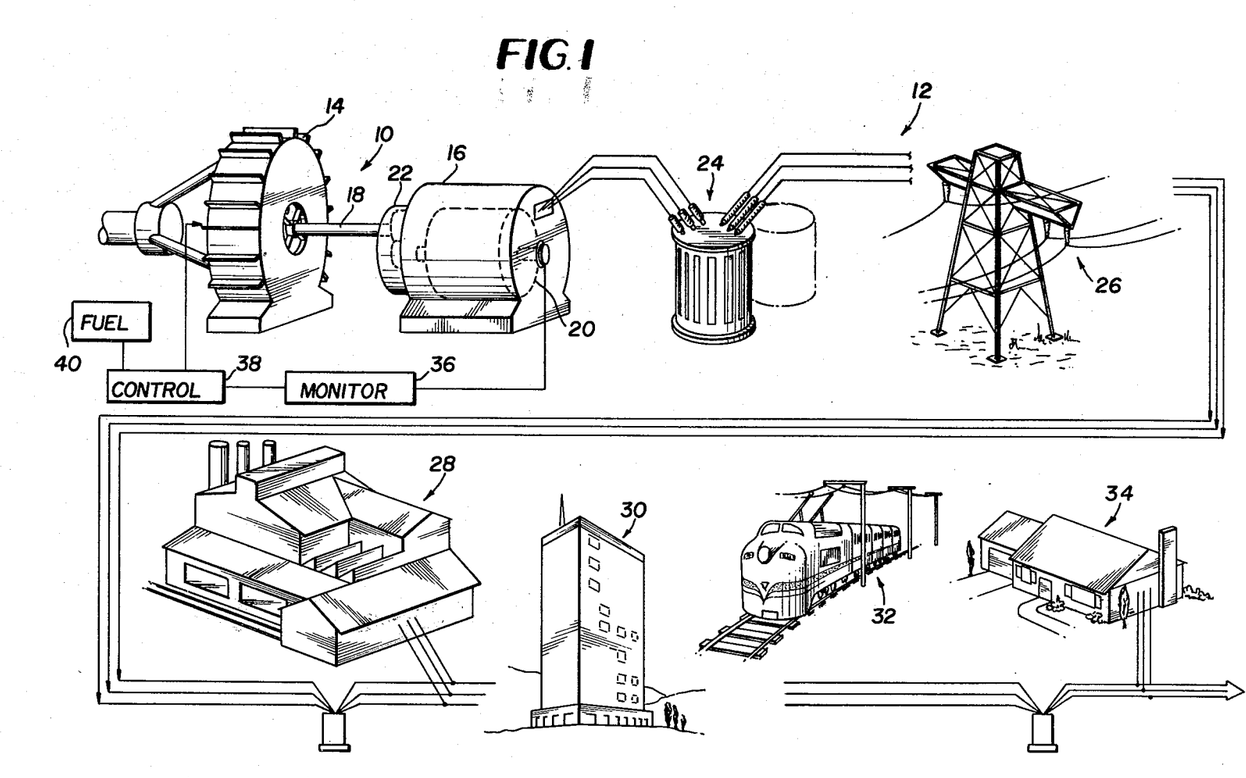
FIG. 1 is an axonometric schematic view of a reaction engine driven generating system in accordance with a preferred embodiment of the invention in cooperation with an illustrative electrical distribution system.

Referring now to the drawings and particularly to FIG. 1 thereof, there will be seen a schematic representation of a reaction engine driven generating system 10 in accordance with a preferred embodiment of the invention and a conventional electrical distribution system 12.

More specifically the reaction engine drive system includes a generally cylindrical housing 14 having a generally horizontal central longitudinal axis positioned adjacent an electrical generator unit 16. A drive shaft 18 extends axially within the housing and is driven by a plurality of reaction engines (not shown) within the housing.

The drive shaft 18 operably connects to the rotor or armature 20 of the adjacent generator either directly or through a spur gear train 22 as previously discussed.

A typical electrical distribution system 12 is shown connected to the subject electrical generating system and includes an initial transformer station 24 which converts 12,500 to 25,000 volts current to 138,000 to 765,000 volts for transmission over long lines 26 to a plurality of user stations such as an industrial user 28, a commercial user 30, a transportation user 32, a home user 34 and the like.

It will be appreciated that user demand varies over the course of a day such that at peak loads extra resistance will be placed on the generating equipment with a tendency to slow down the speed of rotation of the generator rotor. In order to provide a generally constant rotor speed under varying loads, the subject system detects drive shaft or armature rotation speed by a monitor 36. This information is input to a suitable controller 38, such as a flow valve or fuel pump, connected to a fuel system 40 leading to the reaction engines. Accordingly as armature speed tends to decrease with added loads, the fuel is increased to the reaction engines which maintains the desired drive shaft and rotor speed.

Figures 2, 3:
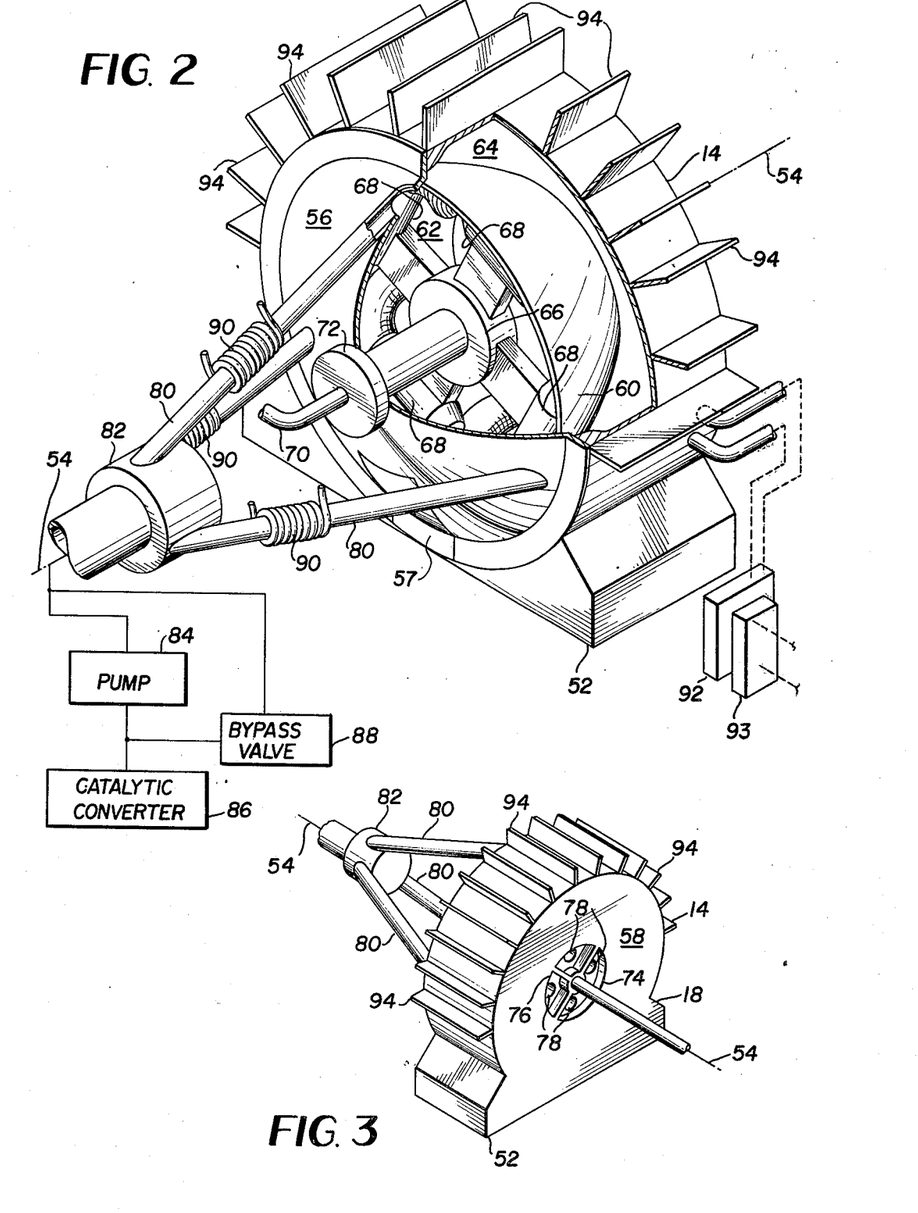
FIG. 2 is a detailed axonometric view of a reaction engine drive system wherein a portion of an exterior cylindrical housing has been broken away to disclose internal structure detail.
FIG. 3 is a reduced axonometric view of the subject reaction engine drive taken at an alternative perspective with respect to the view depicted in FIG. 2.

Turning now to FIGS. 2 and 3 there will be seen axonometric views of a reaction engine drive system in accordance with a preferred embodiment of the invention. More specifically a generally cylindrical housing 14 is shown mounted upon a base assembly 52 such that a central longitudinal axis thereof 54 extends generally parallel with a ground surface.

The housing 14 is fitted with a first 56 and second 58 end plate to form an enclosure. A truncated cone, exhaust deflector 60, is mounted within the housing enclosure wherein a base portion of the cone abuts against the first end plate 56 and an upper portion of the truncated cone abuts against the second end plate 58. The cone may be preferably fashioned with outwardly arcuate side walls and forms in cooperation with the exterior housing and end plates, an inner 62 and outer 64 chamber within the housing. An entrance and exit door 57 to inner chamber 62 with first plate 56 and access to outer chamber 64 is provided at a suitable location.

A drive shaft 18 coaxially projects into and through the housing and carries a reaction force rotation unit 66 and reaction engines 68 as well as will be discussed more fully below. These engines are supplied fuel such as alcohol, hydrogen or synthetic compositions, as previously discussed through a supply conduit which is coaxially connected to internal passages within the drive shaft. A slip ring connection of conventional design 72 interfaces between the stationary supply line 70 and the rotating shaft 18.

Oxygen is supplied to the reaction engines 68 through an enlarged inlet port 74 coaxially fashioned within the second end plate. As air inlet disc 76 is axially mounted upon the drive shaft 18 and engages the inner periphery of the inlet port 74. The air inlet disc 76 is fashioned with a plurality of air inlet apertures 78 which correspond in number to the number of reaction engines such that air inlet may be conveyed directly from the inlet port to the intake of the reaction engines.

Supplied with fuel and oxygen the turbo jet engines 68 serve to rotate the reaction force rotation unit 66 and drive shaft 18 to power an electrical generator 16 as previously discussed.

As exhaust emits from the rotating turbo jet engines it is deflected against the deflection cone 60 and co-mingles within the inner chamber before being exhausted through a plurality of exhaust ducts 80 leading to an exhaust manifold 82.

Exhaust gases from the inner chamber 62 may be withdrawn by a pump 84 and fed through a catalytic converter 86 to the atmosphere. Alternatively, exhaust gases may bypass the pump. In one embodiment heat exchange coil 90 are wrapped around the exhaust conduits 80 to extract useful heat energy to gasify liquid hydrogen fuel, provide auxiliary building heat, or serve other useful purposes where heat energy may be desirable.

In addition to the heat exchange conduits 90, the outer chamber 64 is continuously filled at suitable inlet points with a heat exchange fluid, such as water, which is circulated around chamber 64 and fed to a plurality of fluid pumps 92 for transmission to places that would benefit from the energy contained in the heated flud. In some situations it may be desirable to maintain a constant output fluid temperature and provide additional heat to fluid leaving the outer chamber 64. In such event, a plurality of thermostatically controlled auxiliary heaters 93 linked to desired output fluid temperature is positioned on a downstream side of the fluid pumps 92 to heat fluid in an outgoing fluid line as indicated in FIG. 2.

Still further the cylindrical housing 14 is operably fitted with a plurality of radially projecting, longitudinally extending heat exchange fins 94 to provide added cooling as desired.

Referring now to FIGS. 4–12 there will be seen various detailed views of structural aspects of the subject reaction engine drive system.

Figure 4:
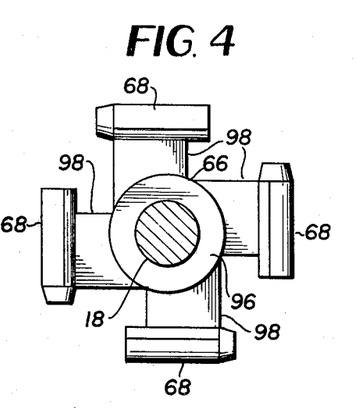
FIG. 4 is a detailed planned view of a central drive shaft, a reaction force rotation unit and a plurality of reaction engines mounted thereupon.

FIG. 4 discloses more clearly the reaction force rotation unit 66 fixedly mounted upon the drive shaft 18. A reaction force rotation unit includes a cylindrical base 96 and a plurality of radiating structural arms 98. A reaction engine 68 is mounted at the end of each arm to turn the unit as previously noted. The arm offset integral to the unit would provide more base area to the unit's base.

Figure 5:
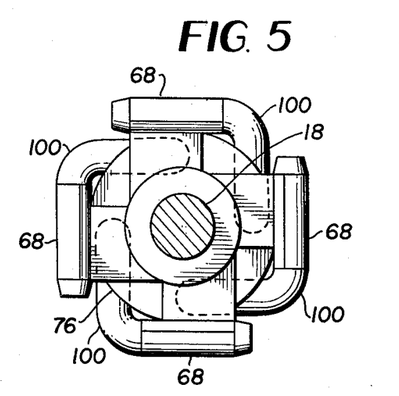
FIG. 5 is an elevational view similar to the view depicted in FIG. 4 wherein an air inlet disc is disclosed in cooperation with inlet conduits to deliver air directly to the plurality of reaction engines.
Figures 6, 10, 11:
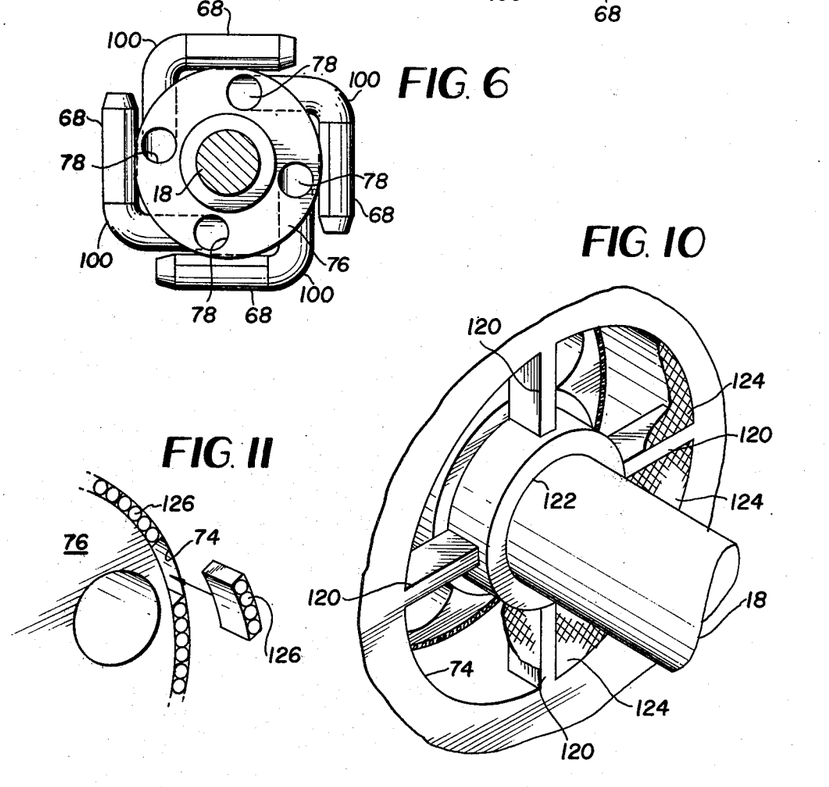
FIG. 6 is a front view of the air inlet disc as depicted in FIG. 5.
FIG. 10, note sheet 3, is a detailed view of an enlarged air inlet port within one end plate of the reaction engine housing including the provision of an inlet screen means to prevent foreign objects from being sucked into the reaction engines.
FIG. 11 is a detailed view disclosing a bearing system between the outer periphery of the air inlet disc and the inner periphery of the enlarged air inlet port fashioned through one end plate of the reaction engine housing.

FIGS. 5 and 6 illustrate an air inlet disc 76 fixedly mounted upon the drive shaft 18. The air inlet disc 76 has a plurality of air inlet apertures 78. Air conduits 100 extend from these inlet apertures directly to the inlet of a corresponding turbo jet engine.

Figure 7:
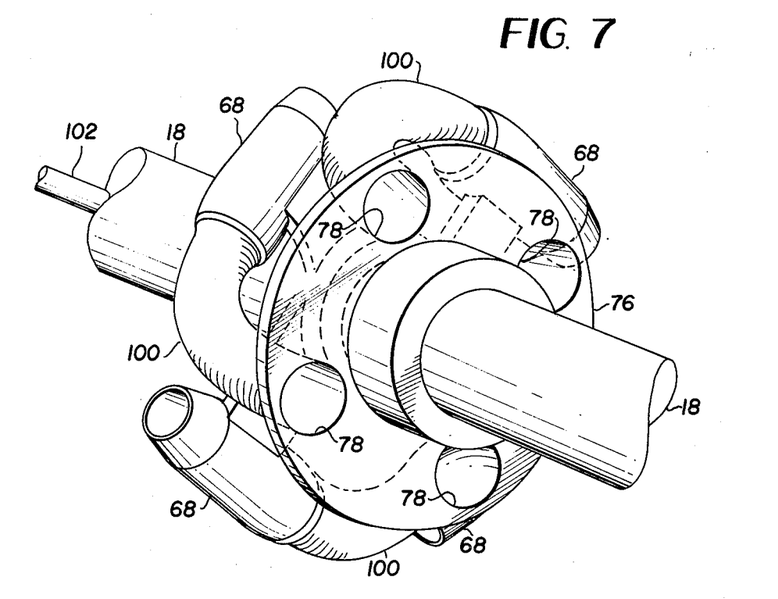
FIG. 7, note sheet 3, is an axonometric view of the air inlet disc and reaction engines mounted upon the reaction force rotation unit and drive shaft in accordance with the invention.

FIG. 7 further details the above discussed arrangemnet including the provision of a fuel conduit 102 axially extending within the drive shaft 18. This conduit feeds into a manifold and radial lines leading to the individual engines 68.

Figures 8, 9:
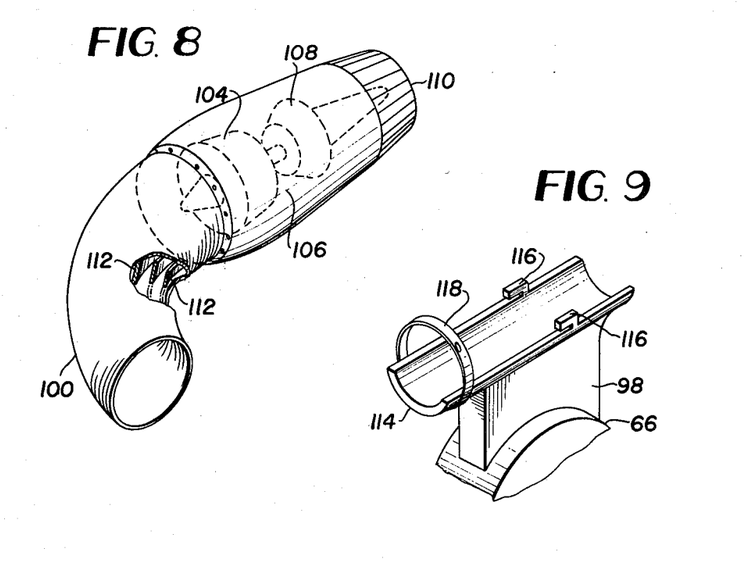
FIG. 8 is a schematic axonometric view of a single reaction engine and air inlet conduit including air flow normalizing vanes within the interior of the curved inlet conduit.
FIG. 9 is a detailed axonometric view of a reaction engine mounting assembly.

The engines 68 are preferably turbo jets, note FIG. 8, having a compression stage 104, a combustion stage 106 and a turbine stage 108 to drive the compressor. Power is provided by the thrust of the expanded gas as it leaves the engine exhaust 110.

The air conduit 100 bends from a longitudinal to a transverse posture from the air inlet disc to the reaction engine. Internal vanes 112 are mounted within the conduit 100 in order to facilitate a generally uniform flow stream around the curved portions of the conduit.

As shown in FIG. 9, the turbo jet may be releasably connected to the extremity of a support arm 98 by the provision of a mounting saddle 114 having thrust mounting blocks 116 and a plurality of circumferential mounting collars 118.

FIGS. 10 and 11 disclose detailed views of the housing inlet port 74 which includes inwardly directed mounting brace 120 which support a suitable cylindrically enclosed bearing 122 and carries drive shaft 18. Windows between the brace 120 are fitted with filter or screen means 124 which block entry of foreign objects, other debris, birds, etc. which are carried by an air stream into the air intake apertures. Alternatively a screen or filter may be fitted directly across each inlet apparatus 78. The air intake disc 76 is rotationally supported within the air inlet port 74 by the provision of roller bearings 126, note particularly FIG. 11.

Figures 12, 13, 15:
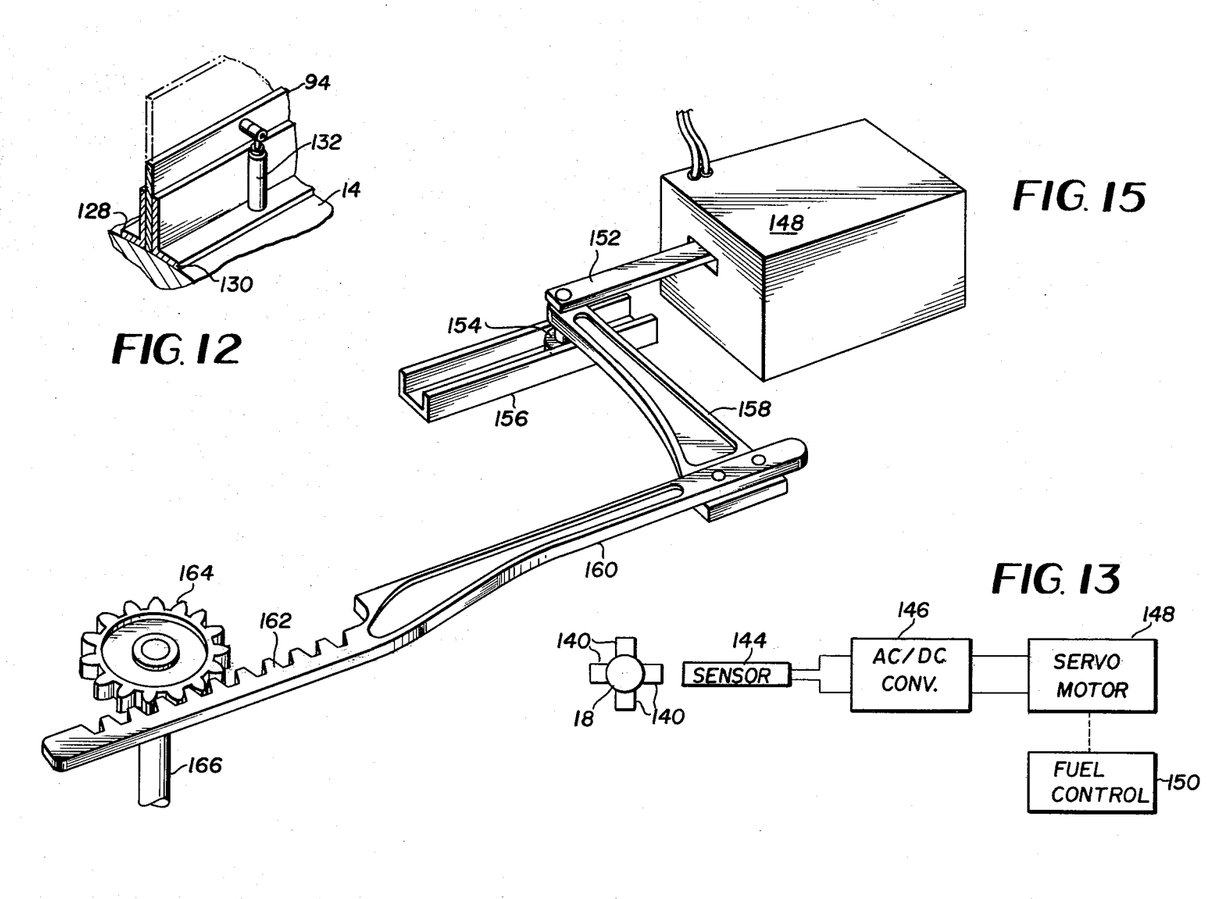
FIG. 12, note sheet 5, is an axonometric, partial, view of a system for selectivity removing the heat exchange fins from heat transfer contact with the outer periphery of the reaction engine housing.
FIG. 13 is a schematic view of one preferred embodiment of a drive shaft speed monitoring system and fuel control in accordance with a preferred embodiment of the invention.
FIG. 15, note sheet 5 again, is a detailed view of a servo motor and actuating linkage which is openly connected to a fuel control system in accordance with the invention.

As previously noted, the exterior peripheral surface of the housing 14 is fitted with a plurality of radially projecting, longitudinally extending vanes 94. These vanes may be selectively removed from heat exchange contact with the housing as illustrated in FIG. 12. More specifically, in one embodiment, each vane is supported by left 128 and right 130 mounting brackets which are mounted upon the housing and slidably receive opposite sides of a vane 94. Piston and cylinder assemblies 132 extend between the vane and mounting bracket such that the vane may be selectively lifted above heat exchange contact with the housing 14.

The subject invention further includes apparatus 36 to monitor armature or drive shaft speed such that fuel flow may be regulated to the engines to maintain a generally constant armature speed nonwithstanding varying electrical loads. The subject monitoring/control systems are (1) a rotor rotation rate variation detector system, (2) an eddy current inducement system and (3) a mangetic interaction control system.

Figures 14, 16, 17:
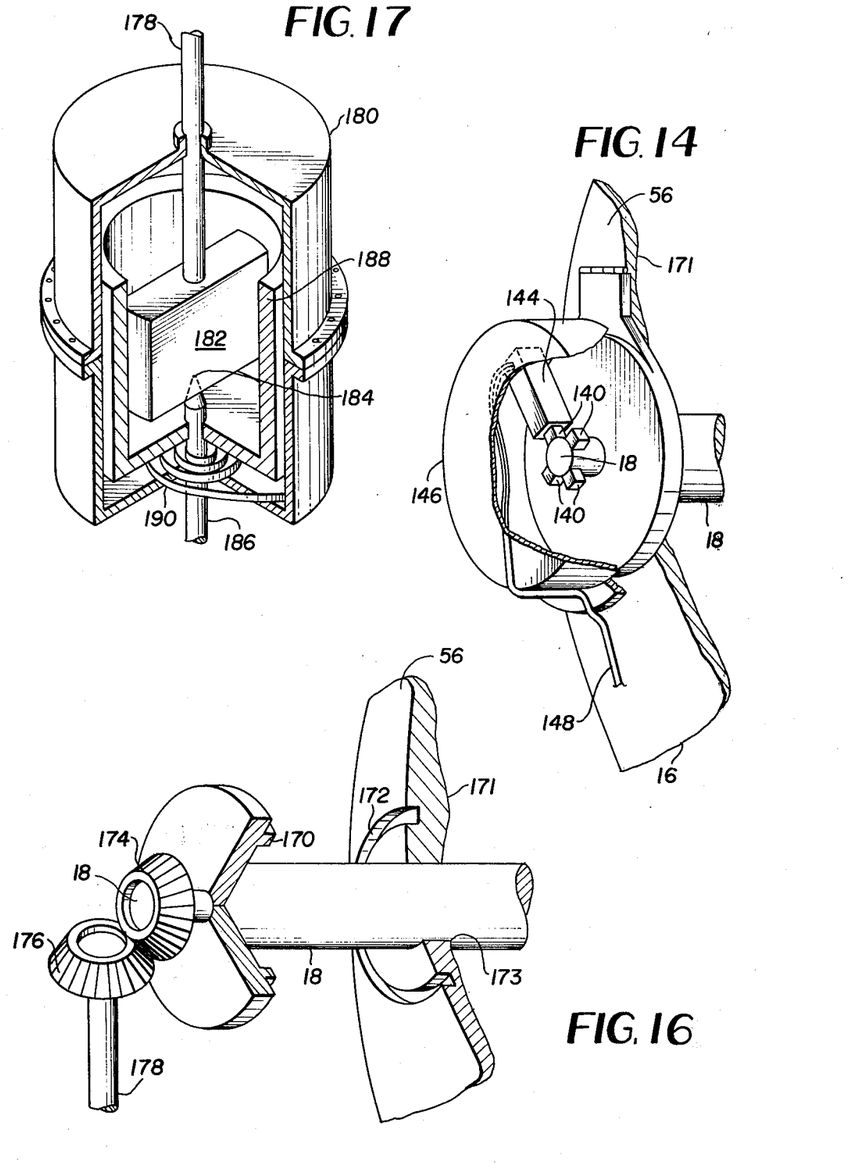
FIG. 14, note sheet 6, is a detailed view of a magnetic rotation pick-up mounted upon one end of the drive shaft; fuel conduit line not shown for clarity.
FIG. 16, note sheet 6, is a detailed view of a direct bevel gear take-off on the drive shaft in accordance with another preferred embodiment of the invention; fuel conduit line not shown for clarity.
FIG. 17 is a detailed axonometric view, partially broken away, of an eddy current apparatus operable to monitor the speed of rotation of the reaction engine drive shaft in accordance with the invention.

The rotor rotation rate variation detector system is disclosed in FIGS. 13–15. Schematically this system comprises a plurality of magnets 140 radially mounted upon a shaft extending outwardly of the drive shaft 18. A sensor 144 is positioned adjacent the rotating magnets and registers an impulse upon each passage of a magnet. This signal is fed through an AC/DC converter to a servo motor 148, which in turn is connected to a fuel control 150 such as flow valve, fuel pump actuator, or the like.

Structurally the magnetic pickup 144 is mounted within hinged protective cap 146 at the end of Plate 56, note FIGS. 2 and 14. The fuel conduit line 70 (FIG. 2) and 102 (FIG. 7)—same fuel conduit—is not shown for clarity. Output from the magnetic pickup 144 is fed via a line tray 148 to an AC/DC converter and servo motor 148, note FIG. 15. An actuator arm 152 projects outwardly from the servo motor and terminates with a roller follower 154 guided within a track cradle 156. The actuator arm 152 also connects to an offset arm 158 which carries a torque arm 160 having a rack 162. The rack 162 meshes with a spur gear 164 which drives a shaft 166 connected to a fuel flow control valve, fuel pump regulator of the like.

FIGS. 16 and 17 disclose an alternative preferred monitor comprising an eddy current inducement system. More specifically the drive shaft 18 extends through the plate 56 and is rotatably supported by a ring bearing 170 and enclosed suitable cylindrically bearing unit 173, note FIGS. 14 and 16. The fuel conduit line 70 is not shown for clarity.

Plate 56 is strengthened at appropriate points 171 to provide suitable structural integrity.

The shaft 178 acially extends into a control housing 180 and carries a permanent magnet 182. The magnet 182 is supported within the housing by a needle bearing 184 atop a shaft 186. A cylindrical receptacle 188 composed of non-magnetic material is mounted upon the shaft 186 and extends about the permanent magnet 182. A coil spring 190 extends between the housing 180 and the shaft 186 and serves to bias the shaft into a given position of rotation.

In this system, as previously noted, rotation of the magnet 182 within the receptacle 188 will induce an eddy current tending to rotate the cup against the spring 190, which in turn will rotate shaft 186 to control an engine fuel pump or the like.

Figures 18, 19:
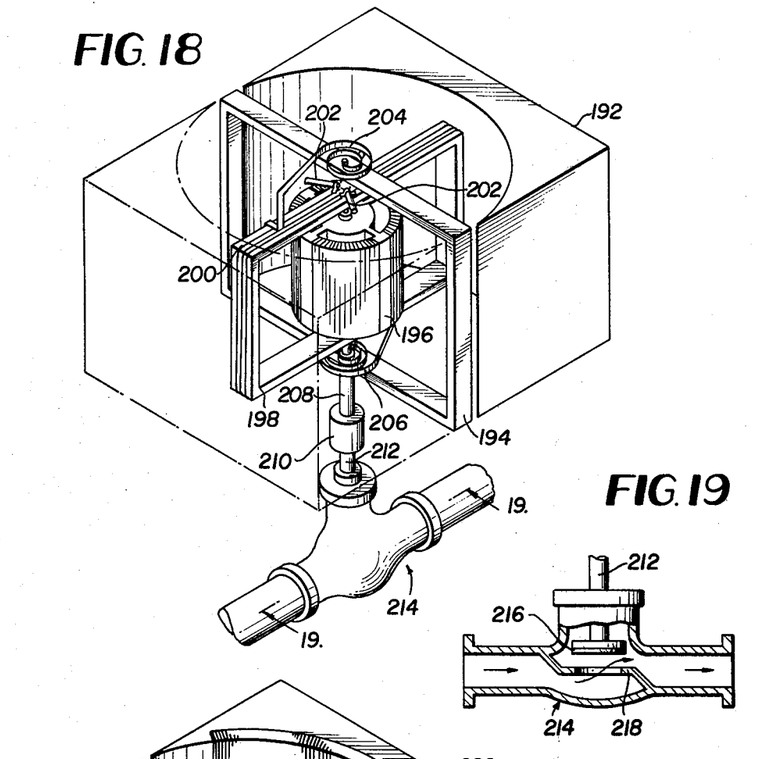
FIG. 18 is a further preferred embodiment of the invention wherein a pair of electrical coils are utilized to electrically monitor the speeds of generator armature and drive shaft rotation.
FIG. 19 is a detailed vertical sectional view of a flow control valve taken along section line 19—19 in FIG. 18.
Figure 20:
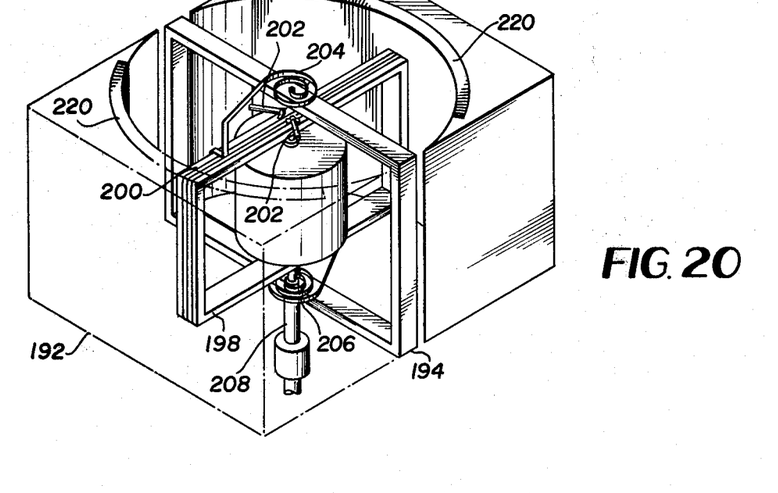
FIG. 20 is yet a further embodiment of the invention for electrically monitoring drive shaft speed.

FIGS. 18–20 disclose various views of magnetic interaction control monitors in accordance with the invention. In FIG. 18 a housing 192 carries a stationary frame member 194. A cylindrical interaction coil 196 is mounted within the frame 194. A torque frame 198 is pivotally mounted within the stationary frame 194 and carries a wrap or coil of wire 200. Balance weights 202 are mounted upon the torque frame and an upper 204 and lower 206 coil spring extends between the stationary frame 194 and the torque frame 198.

In operation a direct current voltage proportional to the generator voltage is applied to the interaction coil 196 and direct current porportional to the generator current is applied to the torque coil. This voltage and current may be electrically tapped from the generator lines and stepped down to be compatible with the control structure load handling capabilities or shaft 178 may be used to drive a small scale generator which will generate a voltage and current level which could be directly carried by the monitor. In either case the voltage and current will reflect changes in the on-line voltage and current with load variations.

The above-noted variations will induce rotation of the torque frame 198 with respect to the interaction coil 196. This rotation is picked up by a shaft 208 connected to the torque frame. The shaft 208 in turn is connected through a longitudinal slip joint 210 to the screw spindle 212 of a fuel valve 212, note FIG. 19. The spindle 212 serves to raise and lower a valve disc 216 with respect to a valve seat 218 to regulate the flow of fuel to the reaction engines. Alternatively the shaft 208 could be connected to the control arm of a fuel pump to regulate the fuel consumption of the reaction engines.

FIG. 20 depicts a variation of the magnetic interaction control monitor depicted in FIG. 18. In this, connection of an interaction coil 220 is mounted within the housing 192. The interaction coil 220 then surrounding the torque frame 198 and coil 200.

In operation direct voltage is applied to the interaction coil 220 and direct current is applied to the torque coil. These voltage and current values are proportional to the on-line generator voltage and current and thereby reflect variations in load demand on the system. Accordingly, output shaft 208 may be used to vary fuel flow through a valve on the control arm of a fuel pump to offset tendencies to slow the armature.

The system schematic disclosed in FIG. 1 depicts a single reaction engine drive and generator combination. Those skilled in the art, however, will appreciate that a commercial facility will include a plurality of such units which will admit to increased power capability at a single location. Those skilled in the art also will appreciate the inclusion of a control system into this type of power generating system and the importance of a constant predetermined rotor speed for the generation of current in a predetermined cycles per second. Variable amounts of power must be supplied to the engine in a proportionate amount in order to accommodate the various daily content power load variations. Power load variations create relative resistant variations to rotation of the rotor, the reasons for which can be found in the theories and consequent laws espoused by and experiments performed by Faraday, Lenz, Henry and others that deal with electricity, magnetism, induction and inductative reactance. For those not skilled in the art it becomes readily apparent that it is a violation of the principle of conservation of energy when it is thought that electric energy can be generated from a system without a proportional amount of energy (fuel) put into the system. As load variations occur proportionate fuel inputs must be made into the system.

In describing the invention, reference has been made to preferred embodiments. Those skilled in the art, however, and familiar with the disclosure of the subject invention may recognize additions deletions, modifications, substitutions and/or other changes which fall within the purview of the subject invention. In this connection it should be understood that the foregoing configurations are of preferred embodiments of the invention and may be modified without departing from the subject inventive concepts.

Having thus described my invention what is claimed is:

1. A reaction engine driven electrical generating system comprising:
electrical generator means included field windings and an armature for generating an electrical current upon rotation of the armature;
generally closed housing means positioned adjacent said electrical generator means;
drive means mounted within said housing means and connected to said armature for rotating said armature, said drive means including,
 a drive shaft operably connected at one end to said armature and extending through a bearing and into said housing,
 a reaction force rotation unit connected to the other end of said drive shaft within said housing,
 mounting arms radially extending outwardly from said reaction force rotation unit,
 reaction engine means connected to the other extremities of said mounting arms, within said housing,
disc inlet means connected to said drive shaft and radially extending outwardly therefrom into operative engagement with the inner periphery of an inlet port fashioned laterally within said housing means, said disc inlet means having a plurality of inlet apparatus radially offset with respect to said drive shaft;
conduit means extending between each of said disc inlet apertures and an intake of a respective reaction engine means;
exhaust means connected to said housing for collecting and directing exhaust away from said reaction engine means, said exhaust means including
 peripherally closed exhaust deflector means mounted within said housing means coaxially about said drive shaft and radially adjacent to but spaced from said reaction engine means;
monitor means operably connected to said drive shaft means for determining the speed of rotation thereof and thus the thrust needed to drive said armature at a generally constant speed with varying loads drawn on the electrical generating system; and
fuel control means connected to said monitor means for regulating the amount of fuel input to said reaction engine means to maintain the level of thrust needed to drive said armature at a generally constant speed with varying electrical loads.

2. A reaction engine electrical generating system as defined in claim 1 and further comprising:
roller bearing means extending between the outer periphery of said disc inlet means and the inner periphery of said housing inlet port.

3. A reaction engine electrical generating system as defined in claim 1 and further comprising:
screen means extending between said drive shaft and said housing inlet port for preventing foreign objects from being drawn into said disc inlet apertures and the intake of said reaction engine means.

4. A reaction engine electrical generating system as defined in claim 1 wherein:
said inlet apertures of said disc inlet means open generally longitudinally at regular peripheral locations about said drive shaft and said reaction engine means are connected upon said mounting arms for rotation in a plane transverse to said drive shaft such that each conduit means extending between a respective inlet aperture and an air intake of a reaction engine means is turned from a longitudinal to transverse orientation and guide vane means extend within each of said conduit means to facilitate uniform air flow into the inlet of said reaction engine means.

5. A reaction engine electrical generating system as defined in claim 1 and further comprising:
water jacket means surrounding said exhaust means within said housing means for absorbing at least a portion of the exhaust heat liberated by said reaction engine means; and
inlet and outlet means connected to said water jacket for withdrawing heat energy from said water jacket means for subsequent use as desired.

6. A reaction engine driven electrical generating system comprising:
electrical generator means included field windings and an armature for generating an electric current upon rotation of the armature;
housing means positioned adjacent said electrical generator means;
drive means mounted within said housing means and connected to said armature for rotating said armature, said drive means including,
 a drive shaft operably connected at one end to said armature and extending through a bearing and into said housing,
 a reaction force rotation unit connected to the other end of said drive shaft within said housing, mounting arms radially extending outwardly from said reaction force rotation unit,
reaction engine means connected to the other extremities of said mounting arms, within said housing,
disc inlet means connected to said drive shaft and radially extending outwardly therefrom into operative engagement with the inner periphery of an inlet port fashioned laterally within said housing means, said disc inlet means having a plurality of inlet apertures radially offset with respect to said drive shaft;
conduit means extending between each of said disc inlet aperatures and an intake of a respective reaction engine means;
exhaust means connected to said housing for collecting and directing exhaust away from said reaction engine means;
water jacket means surrounding said exhaust means within said housing means for absorbing at least a portion of the exhaust heat liberated by said reaction engine means;
heat exchange fin means mounted exteriorly about said housing means and around said water jacket means;
inlet and outlet means connected to said water jacket for withdrawing heat energy from said water jacket means for subsequent use as desired;
monitor means operably connected to said drive shaft means for determining the speed of rotation thereof and thus the thrust needed to drive said armature at a generally constant speed with varying loads drawn on the electrical generating system; and
fuel control means connected to said monitor means for regulating the amount of fuel input to said reaction engine means to maintain the level of thrust needed to drive said armature at a generally constant speed with varying electrical loads.

7. A reaction engine electrical generating system as defined in claim 6 and further comprising:
means connected to said fin means for selectively removing said fin means from heat exchange contact with said housing means.

8. A reaction engine electrical generating system as defined in claim 1 and further comprising:
pump means for withdrawing exhaust gas from said exhaust means.

9. A reaction engine electrical generating system as defined in claim 8 and further comprising:
means for selectively by-passing exhaust gas around said pump means.

10. A reaction engine electrical generating system as defined in claim 1 wherein said monitor means comprises:
magnet means mounted upon said drive shaft for rotation therewith;
stationary magnetic pick-up means mounted adjacent to said magnet means;
servo motor means connected to said magnetic pick-up means for actuating said fuel control means in response to the speed of rotation of said drive shaft wherein a variation in drive shaft speed will effect a corresponding but opposite variation in fuel input to said reaction engine means to maintain a generally constant speed of said generator armature.

11. A reaction engine driven electrical generating system comprising:
electrical generator means included field windings and an armature for generating an electric current upon rotation of the armature;
housing means positioned adjacent said electrical generator means;
drive means mounted within said housing means and connected to said armature for rotating said armature, said drive means including,
a drive shaft operably connected at one end to said armature and extending through a bearing and into said housing,
a reaction force rotation unit connected to the other end of said drive shaft within said housing,
mounting arms radially extending outwardly from said reaction force rotation unit,
reaction engine means connected to the other extremities of said mounting arms, within said housing,
disc inlet means connected to said drive shaft and radially extending outwardly therefrom into operative engagement with the inner periphery of an inlet port fashioned laterally within said housing means, said disc inlet means having a plurality of inlet apertures radially offset with respect to said drive shaft;
conduit means extending between each of said disc inlet aperatures and an intake of a respective reaction engine means;
exhaust means connected to said housing for collecting and directing exhaust away from said reaction engine means;
monitor means operably connected to said drive shaft means for determining the speed of rotation thereof and thus the thrust needed to drive said armature at a generally constant speed with varying loads drawn on the electrical generating system, said monitor means including,
a non-magnetic cylindrical member;
a magnet coaxially mounted within said cylindrical member for rotation therein and being dimensioned such that it is spaced from the inner peripheral wall of said non-magnetic cylindrical member;
an output shaft coaxially connected at one end to said non-magnetic cylindrical member and operably connected at the other end to fuel control means;
spring means connected to said output shaft for biasing said output shaft in a given position;
means operably connected to said drive shaft and said magnet for rotating said magnet in response to rotation of said drive shaft, wherein variations in rotational speed of said drive shaft will vary the speed of rotation of said magnet and induce rotation of said non-magnetic cylindrical member against said spring bias to regulate the fuel control means to effect regulation of fuel input to said reaction engine means to maintain a generally constant speed of said generator armature; and
fuel control means connected to said monitor means for regulating the amount of fuel input to said reaction engine means to maintain the level of thrust needed to drive said armature at a generally constant speed with varying electrical loads.

12. A reaction engine driven electrical generating system comprising:
electrical generator means included field windings and an armature for generating and electric current upon rotation of the armature;
housing means positioned adjacent said electrical generator means;
drive means mounted within said housing means and connected to said armature for rotating said armature, said drive means including, a drive shaft operably connected at one end to said armature and extending through a bearing and into said housing, a reaction force rotation unit connected to the other end of said drive shaft within said housing, mounting arms radially extending outwardly from said reaction force rotation unit, reaction engine means connected to the other extremities of said mounting arms, within said housing, disc inlet means connected to said drive shaft and radially extending outwardly therefrom into operative engagement with the inner periphery of an inlet port fashioned laterally within said housing means, said disc inlet means having a plurality of inlet aperatures radially offset with respect to said drive shaft;

conduit means extending between each of said disc inlet aperatures and an intake of a respective reaction engine means;

exhaust means connected to said housing for collecting and directing exhaust away from said reaction engine means;

monitor means operably connected to said drive shaft means for determining the speed of rotation thereof and thus the thrust needed to drive said armature at a generally constant speed with varying loads drawn on the electrical generating system, said monitor means including, frame means;

torque coil means pivotally connected to said frame means;

spring means mounted between said frame means and said torque coil means for biasing said torque coil into a given position;

interaction coil means coaxially mounted with respect to said torque coil;

output shaft means connected at one end to said torque coil for rotation therewith and operably connected at the other end to said fuel control means, such that when direct current voltage proportional to said electrical generator voltage is applied to said interaction coil means and a direct current proportional to said electrical generator current is applied to said torque coil, a magnetic interaction will be produced reflective of the speed of rotation of said drive shaft and electrical generator armature which will rotate said torque coil against said spring means to effect regulation of said fuel control means and input of fuel to said reaction engine means to maintain a generally constant speed of said electrical generator armature; and fuel control means connected to said monitor means for regulating the amount of fuel input to said reaction engine means to maintain the level of thrust needed to drive said armature at a generally constant speed with varying electrical loads.

13. A reaction engine electrical generating system as defined in claim 12 and further comprising:

housing means surrounding said torque coil and said frame means, said housing means having a cylindrical well for receiving said torque coil and said interaction coil member being mounted about the inner periphery of said well and thus extending about said torque coil.

14. A reaction engine electrical generating system as defined in claim 12 and further comprising:

cylinder means connected to said frame means and coaxially extending within said torque coil means and said interaction coil means being mounted upon the outer surface of said cylinder means and thus extending within said torque coil means.

15. A reaction engine driven electrical generating system comprising:

electrical generator means for generating a current in response to rotation of an armature within the generator;

generally cylindrical housing means having a generally horizontally extending central longitudinal axis and an enclosed peripheral shell and being positioned upon a base in a posture axially adjacent to said electrical generator means;

first and second plate means extending transversely across the opposite ends respectively of said cylindrical housing to generally form an enclosure;

a generally truncated cone extending within said housing and having a central longitudinal axis coaxial with said generally horizontal axis of said cylindrical housing the base end of said truncated cone abutting against the second end plate to form an inner and outer chamber within the interior of said cylindrical housing means;

a drive shaft coaxially extending through said end plates and said cylindrical housing means and being operably connected to the armature of said electrical generator means;

reaction force rotation means having a plurality of radially extending support spokes mounted about said drive shaft within said inner chamber defined by said truncated cone means;

reaction engine means mounted upon each of said plurality of radially extending support spokes for operably rotating said reaction force rotation means, said drive shaft and said generator armature;

an enlarged air inlet port coaxially fashioned into said second end plate;

an air inlet disc rotatably mounted within said enlarged air inlet port and fixedly mounted about said drive shaft for rotation therewith, said air inlet disc having a plurality of air inlet apertures corresponding in number to the number of said reaction engines mounted within said truncated cone means;

conduit means extending between each of said air inlet aperatures in said air inlet disc and a corresponding inlet of a reaction engine means for conveying air directly from said inlet port to said reaction engine means;

exhaust means connected through said first end plate for conveying exhaust of said reaction engine means away from said generally cylindrical housing means; and means for circulating cooling fluid within said outer chamber of said housing between the exterior of said generally truncated cone and the interior of said generally cylindrical housing.

16. A reaction engine driven electrical generating system as defined in claim 15 wherein:

said first end plate extending across the base of said internal truncated cone is arcuately enlarged outwardly from said generally cylindrical housing to form an enlarged exhaust chamber to receive exhaust from said reaction engine means.

17. A reaction engine driven electrical generating system as defined in claim 15 and further comprising:

auxiliary heating means connected to said means for circulating cooling fluid within said outer chamber for selectively, applying heat to said fluid exterior of said outer chamber for insuring a desired temperature level of fluid exterior of said outer chamber.

18. A reaction engine driven electrical generating system comprising:

electrical generator means for generating a current in response to rotation of an armature within the generator;

generally cylindrical housing means having a generally horizontally extending central longitudinal axis and being positioned upon a base in a posture axially adjacent to said electrical generator means;

a plurality of heat transfer vanes radically projecting and longitudinally extending about said generally cylindrical housing;

first and second plate means extending transversely across the opposite ends respectively of said cylindrical housing to generally form an enclosure;

a generally truncated cone extending within said housing and having a central longitudinal axis coaxial with said generally horizontal axis of said cylindrical housing the base end of said truncated cone abutting against said first end plate and the upper end of said truncated cone abutting against the second end plate to form an inner and outer chamber within the interior of said cylindrical housing means;

a drive shaft coaxially extending through said end plates and said cylindrical housing means and being operably connected to the armature of said electrical generator means;

reaction force rotation means having a plurality of radially extending support spokes mounted about said drive shaft within said inner chamber defined by said truncated cone means;

reaction engine means mounted upon each of said plurality of radially extending support spokes for operably rotating said reaction force rotation means, said drive shaft and said generator armature;

an enlarged air inlet port coaxially fashioned into said second end plate;

an air inlet disc rotatably mounted within said enlarged air inlet port and fixedly mounted about said drive shaft for rotation therewith, said air inlet disc having a plurality of air inlet apertures corresponding in number to the number of said reaction engines mounted within said truncated cone means;

conduit means extending between each of said air inlet aperatures in said air inlet disc and a corresponding inlet of a reaction engine means for conveying air directly from said inlet port to said reaction engine means;

exhaust means connected through said first and plate for conveying exhaust of said reaction engine means away from said generally cylindrical housing means; and means for circulating cooling fluid within said outer chamber of said housing between the exterior of said generally truncated cone and the interior of said generally cylindrical housing.

19. A reaction engine driven electrical generating system as defined in claim 18 and further comprising:

means connected between said cylindrical housing means and said heat transfer vanes for selectively removing said vanes from heat transfer contact with said cylindrical housing means.

* * * * *